Jan. 6, 1942.  H. FRAUENTHAL ET AL  2,268,745
BEARING RETAINING MEANS
Filed March 18, 1939

INVENTORS.
HAROLD FRAUENTHAL, STANLEY R. THOMAS.
BY Walter E. Schimmer
ATTORNEY.

Patented Jan. 6, 1942

2,268,745

UNITED STATES PATENT OFFICE 2,268,745

BEARING RETAINING MEANS

Harold Frauenthal, South Bend, Ind., and Stanley R. Thomas, Lyons, Mich., assignors to Bantam Bearings Corporation, South Bend, Ind., a corporation of Indiana Application March 18, 1939, Serial No. 262,612

7 Claims. (Cl. 308—213)

This invention relates to bearing retaining means, and is a continuation in part of our copending application, Serial No. 229,956, filed September 14, 1938.

In the copending application we have disclosed a number of bearing assemblies having means for retaining the bearings against radial displacement during assembly, comprising bands located against axial movement on the lips of the bearing race.

In that application the bands were secured against axial displacement by means of prick punching portions of the band into angular grooves formed in the faces of the retaining lips of the race, these pricks being spaced apart circumferentially and so arranged as to produce a slight expansion of the band to insure the positive location of the band in the assembly.

The present application constitutes an improvement on such an assembly and reduces materially the cost of the construction. In the present application the bands are located on the faces of the lips by means of spot welding, which positively secures the bands in position and eliminates the necessity of cutting the grooves in the faces and employing the prick punchings heretofore thought necessary. This materially reduces both the cost and time of assembly, and insures a positively located band that cannot be snapped loose under any conditions.

Other objects and advantages of the present invention will appear more fully from the following detailed description which, taken in conjunction with the accompanying drawing, will disclose to those skilled in the art the particular construction and operation of a preferred form of the present invention.

Figure 1:
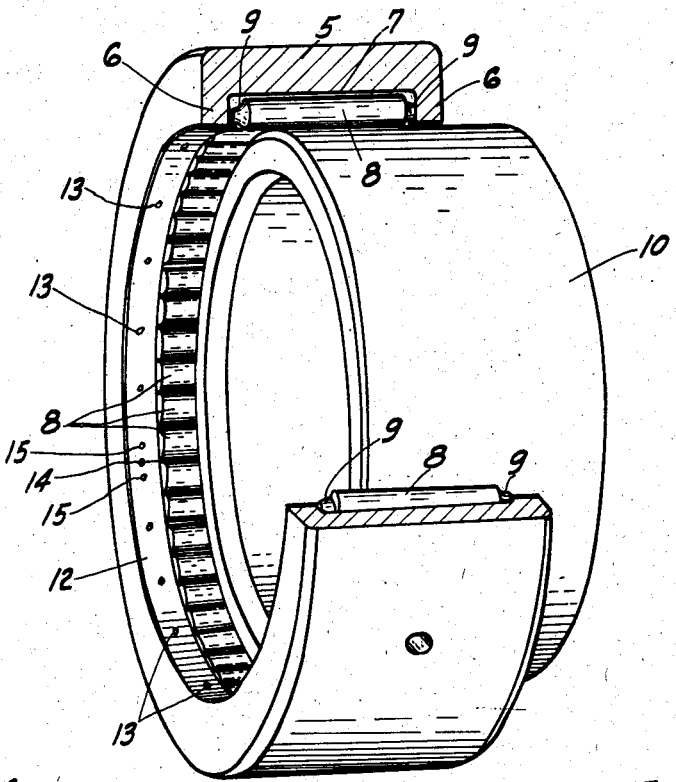
Figure 1 is a perspective view of an assembly embodying the present invention.

Considering now Figure 1 in detail, the outer bearing race 5 is of the usual construction having the radially inwardly extending lip portions 6 which define therebetween the bearing raceways 7 in which are located a plurality of antifriction members or rollers 8 having relatively heavy trunnioned ends 9 which limit the axial movement of the roller members 8. Within the area defined by the circular row of rollers 8 is an inner sleeve or race member 10 upon which the rolls engage, and which supports the bearing assembly.

A suitable metal band 12, preferably made of spring stock and cut from strip to the required length, is inserted in position about the axial face of each of the lips 6, and is of a width such that when located flush with the outer radial faces of the lips 6 the inner edge of the band overhangs the raceway 7 to an extent such as to be engaged by the trunnions 9 of the rollers if they tend to become radially displaced. The band 12 is placed in position on the face of the lip 6, and is then subjected to a series of spot welding operations whereby the metal is axially fused to the metal of the lips 6 to securely locate it against either axial or radial displacement. Preferably, this spot-welding is provided about the entire length of the strip at intervals of approximately 1 inch, with the meeting edges of the bands being welded at the junction, as indicated at 14, and also immediately adjacent the junction on each end of the band as indicated at 15. The other spot welds are indicated generally at 13.

In assembling a construction of this type, the race 5 is first accurately machined and the rollers 8 are then placed therein, preferably being held in position by the use of a suitable lubricant of sufficient viscosity to maintain the rollers in position. If desired, one of the bands 12 may be placed on the face of one of the lips 6 and welded in position prior to the assembly of the rollers, and the adjacent trunnion ends of the rollers then slipped into the channel shaped recess formed by the overhanging edge of the band, the radial face of the lip, and the adjacent portion of the raceway surface 7. The other band is then placed in position and welded in a similar manner. When this has been accomplished, the bearing assembly is complete and the rollers cannot be displaced radially from the race without destruction of the band 12. This insures that the bearing may be handled, changed, and assembled in any desired installation without any necessity of providing additional means of holding the rollers in position. This is of great convenience in the field, and also in shipping the bearings or in storing the same.

It is to be understood that the bands 12 serve no function so far as locating the rollers against axial movement, this being accomplished solely by engagement of the trunnion ends 9 with the defining surfaces of the lips 6 which terminate the raceway 7. The bands 12 serve only to prevent radial displacement of the rollers 8 in handling the bearing, being entirely out of contact with the rollers whenever the bearing has been installed in operative position. This distinguishes from other types of bearing assemblies in which suitable members are carried by the ends of the bearing race, and project radially inwardly and then axially inwardly to form both axial and radial stops for the roller members. Such installations are not satisfactory in that using a band for this purpose does not afford adequate strength against axial displacement of the bearing, and consequently such bearings are easily misalined resulting in rapid self-destruction of the bearing.

Figure 2:
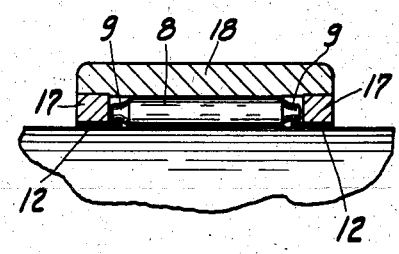
Figure 2 is a sectional view through a modified form of bearing.

In Figure 2 a similar type of bearing is shown except that the integral flanges 6 have been replaced by end rings 17 which are stacked or otherwise held in position in slightly recessed bores formed in the inner annular surface of the race 18. These end rings serve the same function as the lips 6 in supporting axial thrust of the roller members 8, and bands 12 are welded to the inner axial surfaces of the rings 17 in the same manner as described in connection with Figure 1. Here again the bands serve no function except to prevent radial displacement of the rollers 8 by engagement of the trunnion ends 9 when the rollers 8 tend to move away from the raceway 18. When the bearing is assembled in its final operative position there is no contact between the rollers 8 and the bands 12 since axial movement of the rollers 8 is limited solely by the end rings 17.

Figure 3:
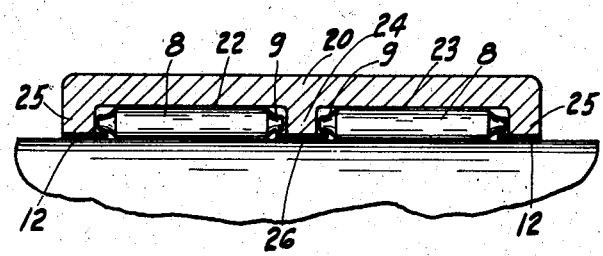
Figure 3 is a corresponding view through a double row bearing.

In Figure 3 a similar construction is provided except that the outer race 20 has two raceways 22 and 23 formed therein in axially spaced relationship and separated by a common radially extending flange 24 and the outer radially inwardly extending lips 25. Again the flange 24 and the lips 25 function to retain the rollers 8 against axial displacement, and radial displacement of the rollers during handling is prevented by the bands 12 welded onto the axial faces of the lips 25. A band 26 is also provided which is welded to the flange 24, as shown, but which projects axially on both sides of the radial faces of the flange to form a retainer for the adjacent ends of both rows of rollers. Here again the rollers do not engage either the bands 12 or the band 26 when in operative position.

Figure 4:
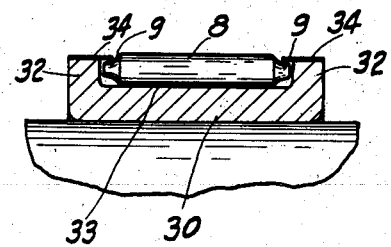
Figure 4 shows the application of the invention to an inner bearing race.

In Figure 4 an inner bearing race 30 is shown having the radially outwardly extending end lips 32 which define therebetween a raceway 33 for receiving the rollers 8. Welded on the axial outer surface of the lips 32 are bands 34 corresponding to the bands 12 which overhang the lips axially inwardly of the raceway to an extent such as to be engaged by the trunnion ends 9 of the rollers if the rollers tend to move radially outwardly of the race. As stated heretofore, the bands 34 have no function during actual operation of the bearing, but function only when the bearing is being handled or shipped.

It is to be understood that the bands may be continuously welded entirely about the circumference, as by stitch welding, resistance welding or the like, instead of having spaced spot welds, although any kind of welding sufficient to secure the bands in proper location can be employed.

It is believed apparent that with this construction a greatly improved bearing is provided which can be very cheaply assembled and which has decided advantages in handling and shipping. Furthermore, it eliminates the necessity of special holding means for the bands, and insures that the bands cannot be accidentally displaced.

We are aware that various changes may be made in certain of the details of the present invention, and we therefore do not intend to be limited except as defined by the scope and spirit of the appended claims.

We claim:

1. A bearing assembly comprising a bearing race member having radially extending end flanges defining therebetween a bearing raceway, trunnion ended rollers in said raceway, said flanges having uninterrupted smooth cylindrical surfaces on the axial faces thereof, and retaining bands on said axial faces of said flanges comprising split band members of a width greater than the flange and of a length equal to the circumference of the face of the flange, each of said bands being wrapped about the face and located so as to overhang only said trunnion ends, said band members being spot welded at circumferentially spaced points and at the abutting ends to the axial faces of said flanges.

2. A bearing assembly comprising an outer race member, radially inwardly directed lips at opposite ends thereof defining therebetween a bearing raceway, a plurality of rollers in said raceway having trunnion ends engaging the lateral faces of said lips to limit axial movement of said rollers, and split spring metal band members on the inner axial faces of said lips overhanging said raceway to an extent sufficient only to retain said rollers against radial displacement during handling, but entirely inoperative when said bearing is mounted in operative position, each of said band members having its adjacent ends abutting and being spot welded to said lip faces at circumferentially spaced points including the point of abutment of said ends.

3. The bearing assembly of claim 2 wherein said overhanging portions of said band members are engageable with said trunnions only when said rollers having moved radially out of said raceway a predetermined distance.

4. A bearing assembly comprising a bearing race member having a plurality of axially spaced radially directed flanges defining therebetween axially spaced bearing raceways, rollers in said raceways having trunnion ends engaging the lateral faces of said flanges to limit axial displacement thereof, and split metal band strips welded at spaced points to the axial faces of said flanges and of a width to overhang the adjacent raceway to an extent such as to be engageable with said trunnions upon predetermined radial displacement of said rollers out of said raceways.

5. The assembly of claim 4 wherein the band strip on the flange common to two raceways is of a width such that it overhangs both raceways.

6. A bearing assembly comprising an outer race member having axially spaced radially inturned end flanges provided with uninterrupted cylindrical axial faces, trunnion ended rollers confined axially in said race member between said flanges, a spring metal band of a width greater than said flange adapted to be wrapped into position on the axial face of each of said flanges with its ends in abutment and with one edge in alinement with the outer radial face of said flange, and circumferentially spaced spot welds permanently securing said band to said face.

7. The combination, with a needle roller bearing assembly comprising an outer race member having radially inturned end flanges provided with smooth axial faces, said flanges defining therebetween a bearing raceway, and a plurality of needle rollers in said raceway having trunnion ends and confined axially by the inner radial faces of said flanges, of retaining means for preventing radial displacement of said rollers comprising a pair of thin spring metal bands each of a length equal to the circumference of the axial face of one of said flanges and of a width greater than the width of the flange, each of said bands being adapted to be wrapped into position on said flange face with the inner edge thereof partially overhanging said trunnion ends of said rollers and with the meeting ends in abutment, said bands having their abutting ends welded to said flange face and also being spot welded at circumferentially spaced intervals to said flange face to secure said bands permanently against displacement from said faces.

HAROLD FRAUENTHAL.
STANLEY R. THOMAS.